(No Model.) 4 Sheets—Sheet 1.
F. A. E. LECHNER.
AUTOMATIC REGULATING DEVICE FOR FLASHING LIGHT APPARATUS.
No. 541,242. Patented June 18, 1895.
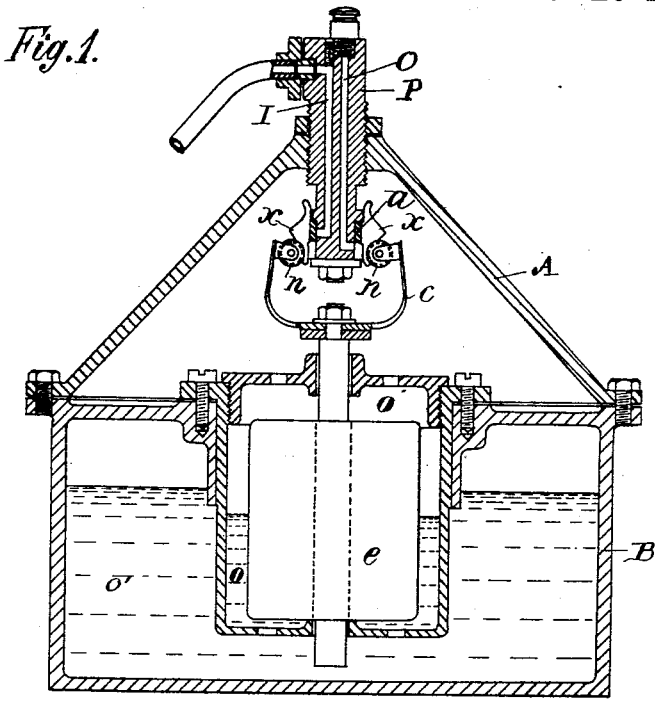
Fig. 1.
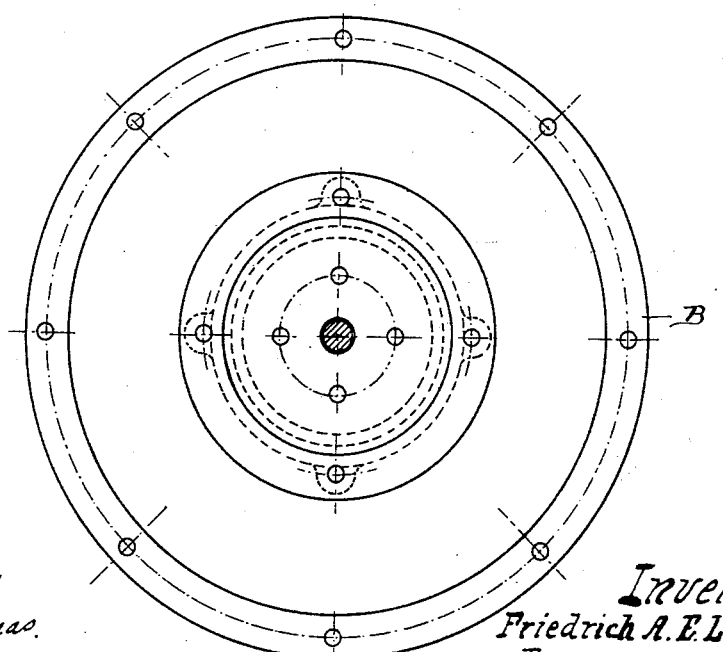
Fig. 1ᵃ.
Witnesses:
Chas. W. Thomas.
Eugenie Persides.
Inventor:
Friedrich A. E. Lechner,
By A. Faber du Faur
Attorney.

(No Model.) 4 Sheets—Sheet 2.
F. A. E. LECHNER.
AUTOMATIC REGULATING DEVICE FOR FLASHING LIGHT APPARATUS.
No. 541,242. Patented June 18, 1895.
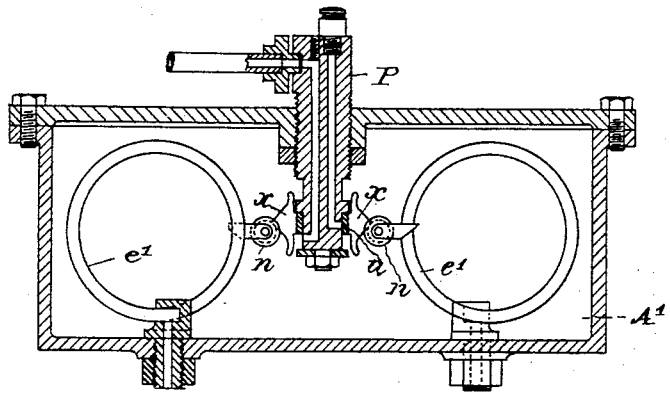
Fig. 2.
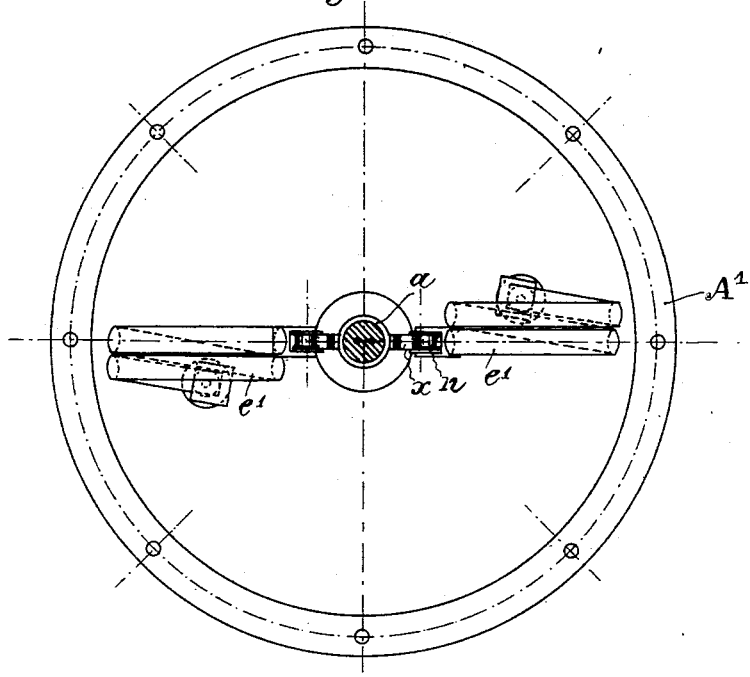
Fig. 2ª.
Witnesses:
Chas. W. Thomas
Eugenie Persides
Inventor:
Friedrich A. E. Lechner,
By A. Faber du Faur
Attorney.

(No Model.) 4 Sheets—Sheet 3.
F. A. E. LECHNER.
AUTOMATIC REGULATING DEVICE FOR FLASHING LIGHT APPARATUS.
No. 541,242. Patented June 18, 1895.
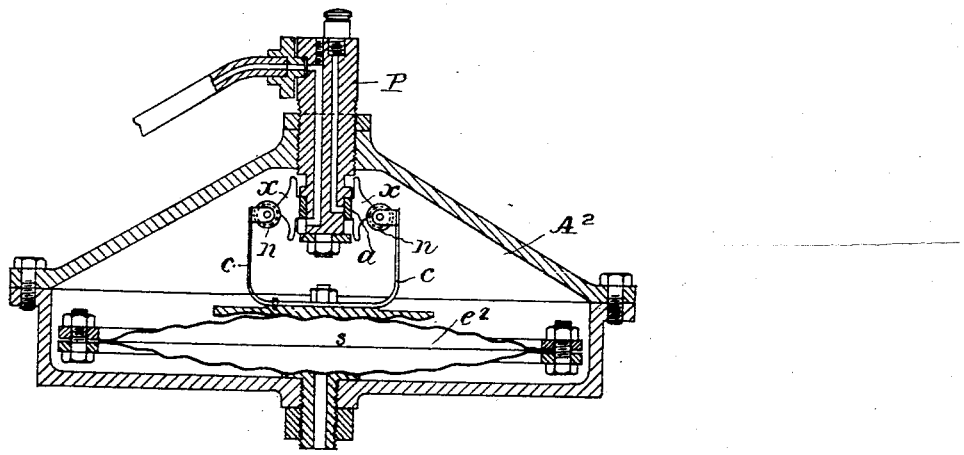
*Fig. 3.*
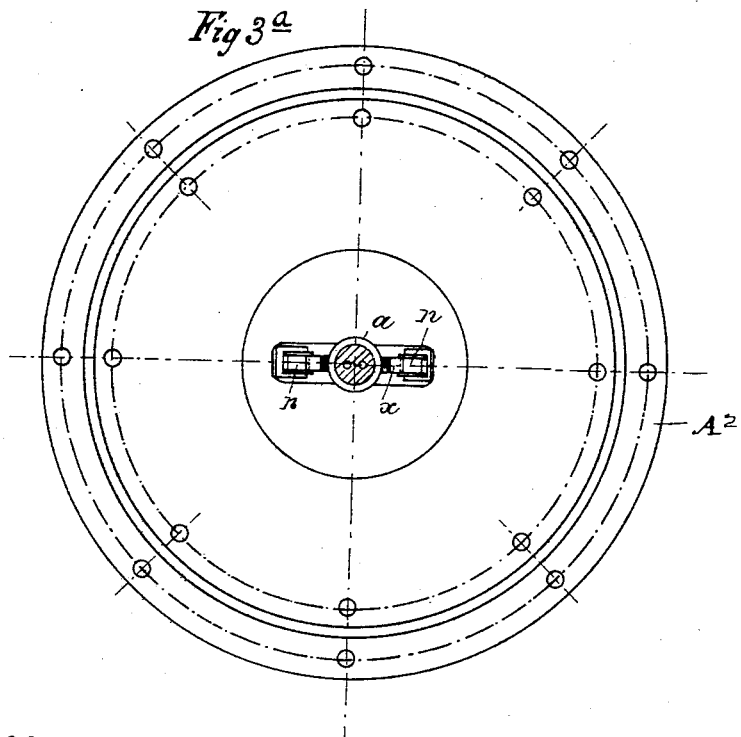
*Fig. 3ª*
Witnesses:
Chas. W. Thomas.
Eugenie Tersides.
Inventor:
Friedrich A. E. Lechner,
By A. Faber du Faur
Attorney.

(No Model.)  4 Sheets—Sheet 4.
F. A. E. LECHNER.
AUTOMATIC REGULATING DEVICE FOR FLASHING LIGHT APPARATUS.
No. 541,242.  Patented June 18, 1895.
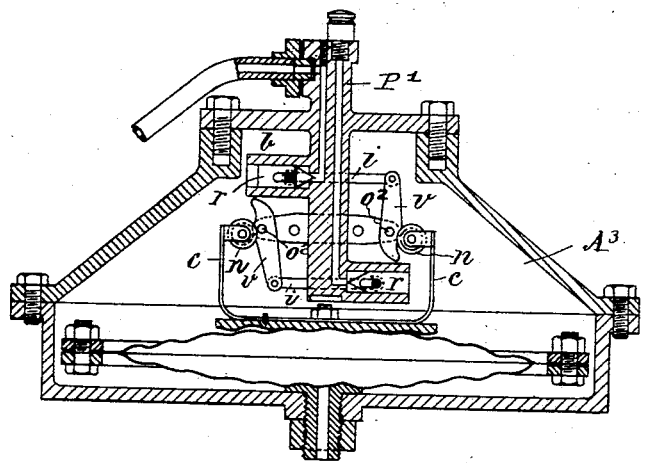
*Fig. 4.*
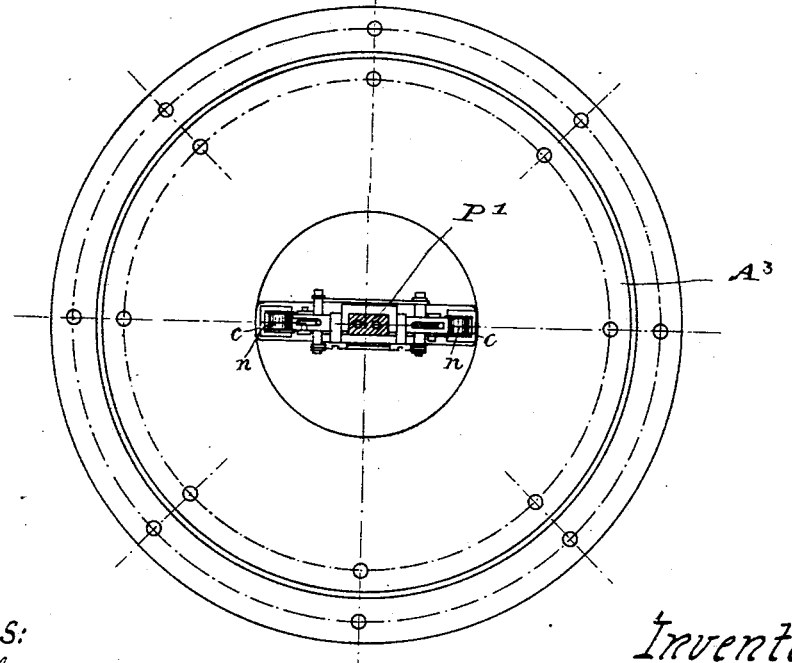
*Fig. 4ª.*
Witnesses:
Chas. W. Thomas,
Eugenie Persides.
Inventor:
Friedrich A. E. Lechner,
By A. Faber du Faur
Attorney.

United States Patent Office.

FRIEDRICH AUGUST ERNST LECHNER, OF LAURAHÜTTE, GERMANY.

AUTOMATIC REGULATING DEVICE FOR FLASHING-LIGHT APPARATUS.

SPECIFICATION forming part of Letters Patent No. 541,242, dated June 18, 1895.

Application filed January 7, 1895. Serial No. 534,013. (No model.)

*To all whom it may concern:*

Be it known that I, FRIEDRICH AUGUST ERNST LECHNER, a subject of the King of Prussia, German Emperor, residing at Laurahütte, in the Kingdom of Prussia, Germany, have invented new and useful Improvements in Automatic Regulating Devices for Flashing-Light Apparatus, of which the following is a specification.

My invention has reference to an apparatus for automatically opening and closing the supply of illuminating gas to a burner, and especially to apparatus adapted for light-houses.

It consists essentially in the combination of a reservoir for gas having a fixed capacity, a valved inlet and outlet for said reservoir, respectively for its connection to the gas-holder or main, and to the burner, a valve-operating device in communication with said reservoir, and an operative connection of the same with the valve or valves of the inlet and outlet for actuating said valve or valves to alternately open and close the supply to said reservoir.

The nature of my said invention will best be understood when described in connection with the accompanying drawings, in which—

Figure 1 represents a vertical section of an apparatus constructed according to my invention. Fig. 1$^a$ is a sectional plan with the reservoir removed. Figs. 2, 3, and 4 are vertical sections illustrating modified forms of the apparatus. Figs. 2$^a$, 3$^a$, and 4$^a$ are sectional plans thereof.

Similar letters of reference designate corresponding parts.

Referring at present to Figs. 1 and 1$^a$ the letter A designates a reservoir having a fixed capacity into the top of which is screwed a nipple P containing an inlet I connected to the gas-holder or main (not shown), and an outlet O connected to the gas burner. The inlet and outlet pass radially through the nipple at their lower ends but at different levels. To the lower end of the nipple P is fitted to slide vertically an annular valve $a$ which can be moved to alternately open and close the inlet and outlet.

The reservoir A is mounted above a vessel B having two communicating chambers $o$ $o'$ partially filled with liquid. Chamber $o$ is in communication with the reservoir A through suitable openings, and in the same is located a float $e$. The rod of said float is provided with two spring arms $c$ carrying roller studs $n$ disposed to engage with two radial tappets $x$ on the valve $a$. The faces of said tappets incline from the center in opposite directions.

Assuming the reservoir A to be full of gas and the outlet O open, the operation of the apparatus is as follows: The level of the liquid in the chamber $o$, owing to the pressure of the gas in the reservoir, is lower than that in the chamber $o'$, and inlet I is closed, but, as the gas in the reservoir is gradually consumed, the level of the liquid in the chamber $o$ rises and lifts the float. The roller studs $n$ $n$ on the arms $c$ ride upwardly on the tappets $x$ and, as soon as the said studs pass over the apexes of the tappets, the lateral pressure exerted by the spring arms $c$ forces the valve downwardly on the nipple, whereby the inlet I from the gas-holder or main is opened and the outlet closed. This action takes place when the gas within the reservoir is substantially exhausted and causes the flashing. Under the pressure due to the influx of gas into the reservoir, the level of the liquid in the chamber $o$ gradually falls and the roller studs $n$ are finally carried below the apexes of the tappets $x$, thereby forcing the valve $a$ upwardly to close the inlet and open the outlet. The gas may be ignited by a small, constantly burning jet located at the burner, or by any of the other well-known devices heretofore used for this purpose; such devices forming no part of my present invention. In this manner the opening for the supply of gas to the burner is automatically opened and closed at predetermined intervals. This alternate opening and closing is effected at substantially regular intervals, in view of the fact that a certain fixed amount of gas is always received by the reservoir.

While I have herein shown a liquid valve-operating device, different forms may be used—for instance, in Figs. 2 and 2$^a$ I have shown two Bourdon springs or tubes $e'$, which are located directly within the reservoir A' and open into the atmosphere; said springs being placed in operative connection with the valve $a$ by substantially the means described in connection with Fig. 1. The roller studs $n$ are, in this instance, mounted in short horizontal arms attached to the ends of the springs or tubes $e'$ and bear against the tappets $x$ on the annular valve $a$. The deflections of the ends of the springs or tubes $e'$ under variations in pressure shift the valve in the manner previously described.

In Figs. 3 and $3^a$ I have shown the operating device for the valve placed in the reservoir $A^2$ to consist of two diaphragms $e^2$ united in a usual manner to form a chamber $s$ and placed in communication with the atmosphere. The roller studs $n$ are, in this instance, mounted in arms $c$ secured to the top of the diaphragm $e^2$.

Instead of using one valve for controlling both inlet and outlet, two separate valves may be used. Such a construction I have shown in Figs. 4 and $4^a$. The single valve is replaced by two conical valves $r$ $r$ having their stems $i$ $i$ connected to valve levers $v$ $v$ pivoted at $o^2$ $o^2$ and engaged by the roller studs $n$ on the arms $c$. The valves $r$ $r$ are guided in suitable hubs cast on the plug and peripherally slotted for the passage of the bolts securing the valve stems to the valves. The nipple $p'$ is in this instance bolted to the reservoir $A^3$.

What I claim as new is—

1. In an apparatus of the character specified, the combination of a reservoir for gas having a fixed capacity, a valved inlet and outlet for said reservoir, respectively, for its connection to the gas-holder or main and to the burner, a valve-operating device in communication with said reservoir, and a connection of the same with the valve for alternately opening and closing the inlet and outlet, substantially as and for the purpose specified.

2. In an apparatus of the character specified, the combination of a reservoir for gas having a fixed capacity, a nipple provided with an inlet for connection to the gas-holder or main and with an outlet for connection with the burner opening into the reservoir at different levels, an annular valve on said nipple controlling the inlet and outlet, an operating device in communication with said reservoir influenced by variations of pressure therein, and an operative connection of said device with the valve, substantially as and for the purpose specified.

3. The combination with the nipple P provided with an inlet and an outlet opening at different levels, of an annular valve mounted to slide on the nipple and provided with tappets $x$, spring arms $c$ adapted to engage with said tappets, and an actuating device for reciprocating the arms, substantially as described.

4. In an apparatus of the character specified, the combination of a reservoir for gas having a fixed capacity, a nipple provided with an inlet for connection to the gas-holder or main and with an outlet for connection to the burner, opening into the reservoir at different levels, an annular valve on said nipple controlling the inlet and outlet, and provided with tapered tappets $x$ $x$, and an operative device influenced by variations of pressure in the reservoir and provided with spring arms $c$ carrying rollers engaging said tappets on the valve for reciprocating the same, to alternately open and close the inlet and outlet, substantially as described.

5. In an apparatus of the character specified, the combination of a reservoir for gas having a fixed capacity, a valved inlet and outlet for said reservoir, respectively, for its connection to the gas-holder or main and to the burner, a valve-operating device in communication with said reservoir, and an intermediate lever connection of the same with the valves for alternately opening and closing the inlet and outlet, substantially as described.

In testimony whereof I have signed my name to this specification in the presence of two subscribing witnesses.

FRIEDRICH AUGUST ERNST LECHNER.

Witnesses:
HENRY W. MARTIN,
E. H. MUMMENKOFF.